United States Patent [19]

Aron et al.

[11] Patent Number: 4,499,491
[45] Date of Patent: Feb. 12, 1985

[54] MOVING MAP DISPLAY USING OPTICAL TUNNEL

[75] Inventors: Mitchell Aron, Harrington Park; Martin W. Feintuch, Fort Lee, both of N.J.

[73] Assignee: Allied Corporation, Morris Township, Morris County, N.J.

[21] Appl. No.: 515,825

[22] Filed: Jul. 21, 1983

[51] Int. Cl.³ ............................................. H04N 7/18
[52] U.S. Cl. .................................. 358/102; 340/995; 364/443; 364/460
[58] Field of Search .................. 340/286 M, 723, 726, 340/990, 995; 353/12, 30, 34; 358/102, 103, 104, 108, 109, 183; 364/518, 521, 443–450, 460

[56] References Cited

U.S. PATENT DOCUMENTS

| | | | |
|---|---|---|---|
| 2,552,464 | 5/1951 | Siezen | 358/49 |
| 3,366,959 | 1/1968 | Roberts | 340/990 |
| 3,523,183 | 8/1970 | Silverman | 358/102 |
| 4,061,995 | 12/1977 | McCrickerd | 340/995 |
| 4,070,662 | 1/1978 | Narveson | 340/726 |
| 4,138,726 | 2/1979 | Girault | 340/995 |
| 4,152,722 | 5/1979 | Inuiya | 358/102 |
| 4,240,108 | 12/1980 | Levy | 358/103 |
| 4,360,876 | 11/1982 | Girault | 340/995 |
| 4,380,776 | 4/1983 | Smith | 358/102 |
| 4,384,338 | 5/1983 | Bennett | 358/104 |
| 4,400,727 | 8/1983 | Aron | 358/102 |
| 4,415,934 | 11/1983 | Konishi | 358/102 |
| 4,418,360 | 11/1983 | Glasgow | 358/108 |

FOREIGN PATENT DOCUMENTS 0604307 9/1978 Switzerland ....................... 353/12

OTHER PUBLICATIONS

Krolak, "The Optical Tunnel—A Versatile Electrooptical Tool", Journal of the SMPTE, vol. 72, Mar. 1963.

Primary Examiner—James J. Groody
Assistant Examiner—Michael F. Heim
Attorney, Agent, or Firm—Stanley N. Protigal; Anthony F. Cuoco

[57] ABSTRACT

A moving map display is provided to represent the location of a vehicle such as an aircraft on a video display of a map. Map images are scanned by a remote pickup unit (40) using flying spot scanning techniques to scan transparencies (51) of sections of the map. In order to increase the resolution of map images, each transparency (51) is divided into a plurality of sections and an image of the flying spot from a CRT (45) is superimposed simultaneously onto the nine sections, using an optical tunnel. In order to scan only the desired portions of these images and in order to produce a coherent display, the images are selectively gated "on", electronically or by using light shuttering techniques. In the preferred embodiment, four of a group of nine images are used to create a given display, although other combinations are possible.

The resultant display is a composite video modulated raster derived from the scanned images on the slide (51). Advantages include the ability to replace individual slides (51) when a section of the map must be updated, and an ability to accomplish positional accuracy which is not dependent upon exact dimensions of a large map area reproduced onto film, and retain full CRT resolution.

19 Claims, 7 Drawing Figures

MOVING MAP DISPLAY USING OPTICAL TUNNEL

BACKGROUND OF THE INVENTION

This invention relates to video displays and more specifically to a moving map display using a flying spot scanner.

Moving map displays are utilized for navigating vehicles such as aircraft, and displaying a segment of a map with a symbolic image of the vehicle fixed at some point on the face of the display, such as at the center thereof. The display is responsive to signals from on-board navigational equipment for indicating the constantly changing location of the vehicle.

Prior art devices utilize a flying spot scanner to scan a portion of film containing a map which modulates the scanner light beam. The display can be in color or monochromatic. Conventional means such as photodetectors are used to convert the modulated light beam to provide a video signal which is used to display the scanned map portion on a cathode ray tube (CRT) screen. In one prior art scheme the flying spot scanner traces a miniature or "shrunk" raster on a portion of a CRT flying spot scanner tube. This tracing allows the flying spot scanner to scan a small portion of the map on the film, and the displayed map portion is electronically translated and rotated in response to navigational signals. Other arrangements feature various combinations of electronic and electro-mechanical means for accomplishing the translation and rotation. One such arrangement involves the mechanical movement of the map film in one direction and electronically moving the scanner beam of the flying spot scanner in an orthogonal direction. Yet another arrangement involves mechanically moving the map in one direction and the use of a moving mirror in the orthogonal direction.

Electromechanical moving map display techniques are costly, cumbersome, require precise mechanical alignment and are more prone to failures and misalignment than are electronic techniques. Electronically moving a miniature raster generated by a flying spot scanner around the face of the scanner is an improvement over the electromechanical arrangements, but it also suffers a shortcoming: The full resolution capability of the CRT flying spot scanner tube is not achieved, as a very small raster is traced on a correspondingly small portion of its face. There is also a limitation on how close each scan line generated by the scanner can be to another scan line. The end result is a limitation in the amount of "resolution" or detail of the map on film that can be obtained and displayed using this technique.

Another disadvantage exists in that for prior art map readers using map film, the map must be reproduced on the film in such a way that large areas of the reproduced map retains carefully controlled dimensions. This type of map film is necessarily generated by a tedious and therefore costly process as will be understood by those skilled in the art.

In accordance with the above, there is a need in the art for an electronic moving map display, wherein mechanical movement is minimized. There is a further need to more completely utilize the full resolution capability of a flying spot scanner. There is yet a further need to provide a display of the type described wherein the cost of producing map film is minimized while providing the required dimensional accuracy of the map as finally displayed.

SUMMARY OF THE INVENTION

This invention contemplates an electronic moving map display using a flying spot scanner to its full resolution capability, wherein the film used can be made by the reproduction of existing paper maps, and wherein portions of the map film may quickly and simply be updated without disturbing the unmodified portion of the map film.

The invention utilizes an optical tunnel, a detailed description of which may be found in an article entitled, "The Optical Tunnel—A Versatile Electro-Optical Tool", starting at page 177 in the March 1963, Journal of the SMPTE, (Society for Motion Picture and Television Engineering) Volume 72, and authored by L. J. Krolak and D. J. Parker. This article is incorporated herein by reference. The optical tunnel is used to simultaneously reproduce multiple images of a cathode ray tube (CRT) trace pattern used in the flying spot scanner of the invention.

The flying spot scanner scans a computer controlled pattern on the face of a CRT. An optical tunnel is disposed in front of the CRT wherein the interior surfaces of the optical tunnel act as mirrors to reflect the flying spot scanner-generated light. Light exiting the optical tunnel is focused by an imaging lens. The optical tunnel and lens cooperatively create a plurality of small scanning beams (flying spots) which are concurrently respectively imaged onto a corresponding plurality of pieces of film to concurrently permit scanning of map sections on each of the plurality of pieces of film which modulate the scanning beams. The plurality of scanning light beams exiting the film fall respectively on a corresponding plurality of field lenses, each of which directs one of the scanning light beams onto a photodetector. The electrical signals from the photodetectors are suitably switched to provide a video signal for displaying a new map segment, made up of portions of other map sections, on a cathode ray tube monitor. In the case of color displays, separate photodetectors in conjunction with suitable color separators may be used for each primary color.

In order to avoid using the modulated light concurrently exiting the plurality of pieces of film at the same time, the electro-optical shutters can be switched to pass the modulated light from only one or a selected number of map segments at a time. The switching of the shutters will occur to select modulated light from the selected map sections to make up a new composite map section at a specific location. The switching of the shutters is accomplished in response to signals from the navigation position determining equipment located on the aircraft.

Advantages include more efficient use of the resolution capability of a flying spot scanner CRT, and an ability for a display to be accurately positioned on a map using low cost reproductions of existing paper maps onto film.

DETAILED DESCRIPTION OF THE PREFERRED EMBODIMENTS

Figures 1, 2:
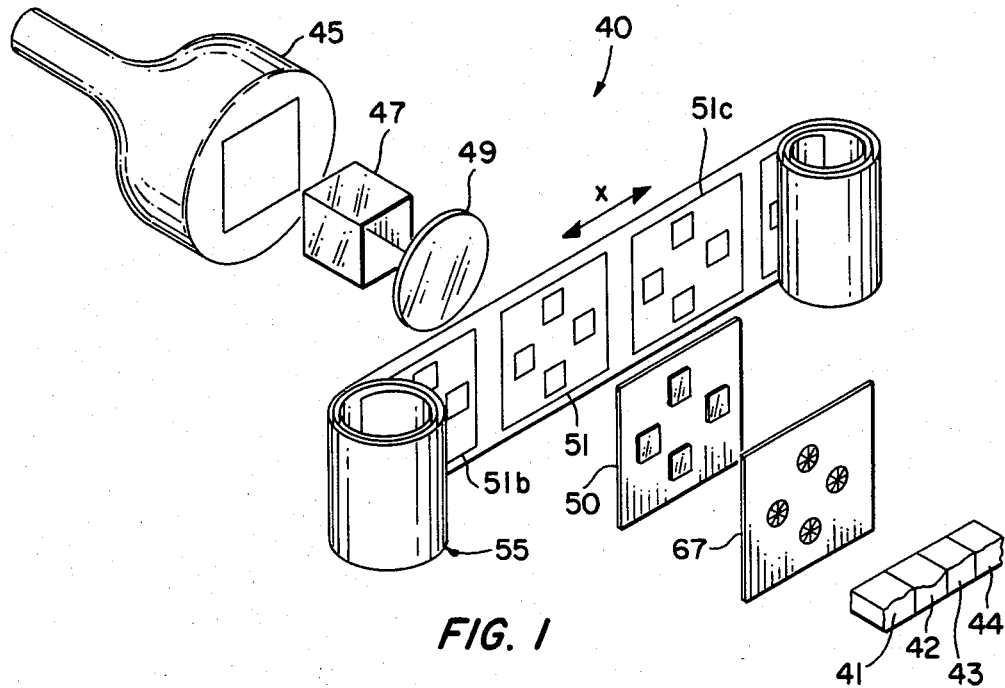
FIG. 1 is a diagrammatic representation showing the general arrangement of the elements of the invention.
FIG. 2 is a diagrammatic representation of a map broken up into a number of sections and a sample composite map section to be displayed in accordance with the invention.

Referring to FIG. 1, a map reader 40, sometimes called a remote map reader, is shown. If a map is to be read on board a vehicle, the map reader 40 is usually installed in the vehicle. While an aircraft with a flight computer will be described, the inventive system can be associated with different types of vehicles or can be stationary and controlled by a suitable navigation signal.

The map reader 40 preferably reads signals from a plurality of photodetectors 41–44, using flying spot scanning techniques. As is common with most flying spot scanning apparatus, light is first transmitted from a cathode ray tube (CRT) 45 which is scanned in a scan pattern. In the preferred embodiment of this invention, the scan pattern is not a raster scan, but is modified as will be described later. Light from the CRT 45 is transmitted through an optical tunnel 47 to an imaging lens 49 and a lens array 50. The lens 49 focuses the light from the CRT 45 onto a film transparency 51.

The optical tunnel 47 is described in volume 72 of the March, 1963, Journal of the SMPTE (Society of Motion Picture and Television Engineers), by Krolak and Parker. Basically, the preferred optical tunnel 47 comprises four flat mirrors arranged at right angles, with pairs of non-adjacent mirrors facing one another so that the end profile of mirrors forms a square. The mirrors thus form a duct having a square cross-section, with the reflecting surfaces of the mirrors on the interior of the duct. The two ends of the duct are open, with one end facing the CRT 45 and the other end facing the imaging lens 49. The effect of the optical tunnel is to cause the scan of the CRT, i.e., the flying spot, to be segregated into a plurality of separate images when focused by the imaging lens 49 onto the transparency 51. In other words, separate images of the spot, as scanned across nearly the entire face of the CRT 45, are focused onto each of the plurality of sections of the film transparency 51 as if the plurality of superimposed images were being separately transmitted from the CRT 45.

Figures 3, 4, 5, 6:
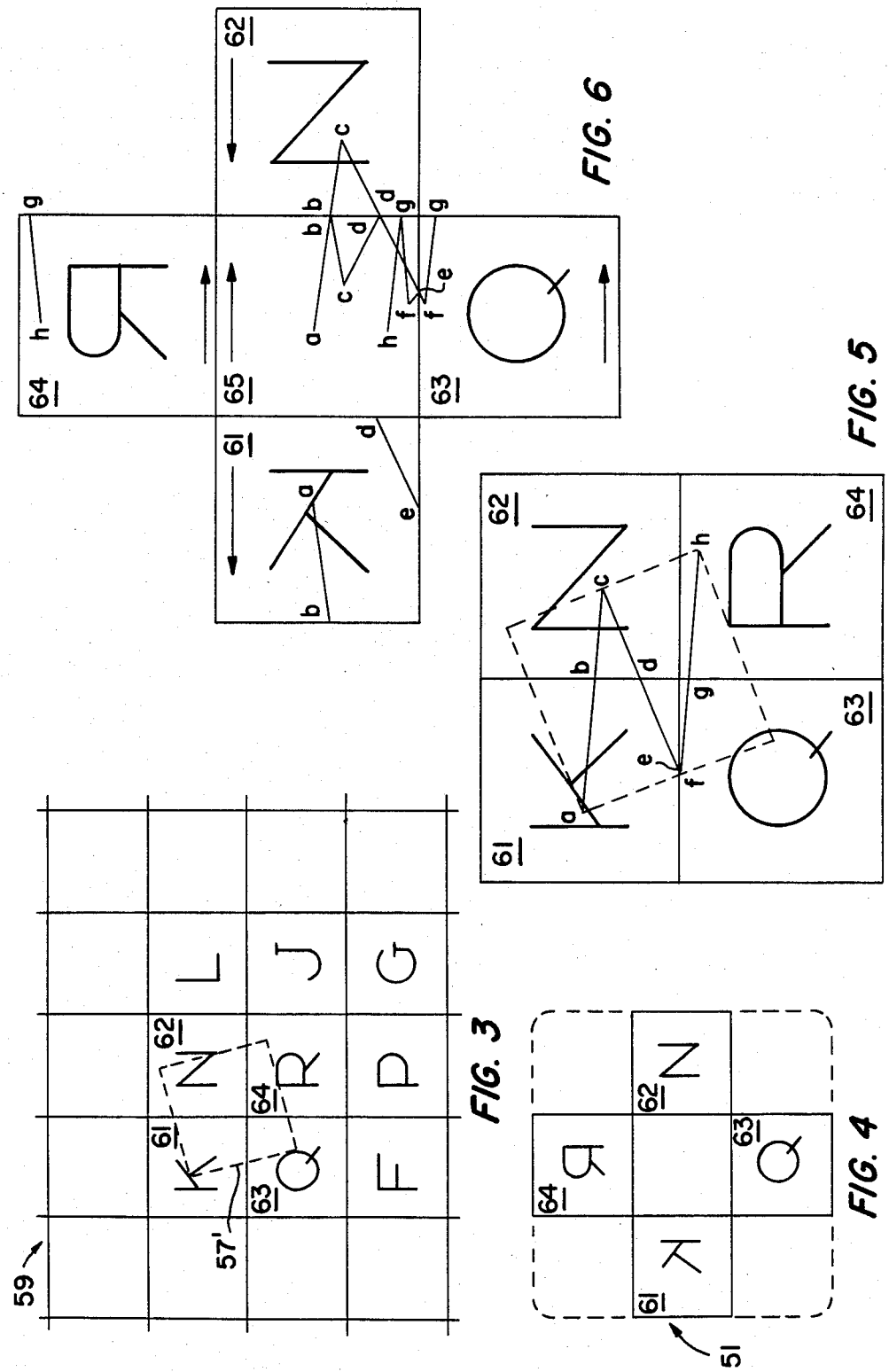
FIGS. 3 and 4 show diagrammatic representations illustrating a sample composite map section, showing a directional representation of map sections scanned by the flying spot scanner to scan the map sections necessary to create a video signal for displaying a composite map segment.
FIG. 5 shows scan patterns used to display the map sections of FIGS. 3 and 4.
FIG. 6 shows scan line segments used to generate the pattern shown in FIG. 5.

In the preferred embodiment, the film transparency 51 is divided into nine sections. As shown in FIGS. 1, 2 and 4, the film transparency 51 is divided into composite map sections, which coincide with the above-mentioned sections of the film transparency 51, and onto which separate images of light from the CRT are focused. From one to four of these segments are used at any one time to produce one image. Film transparency 51 is mounted on a transparency mounting web 55, along with other transparencies, such as transparencies 51b and 51c, shown. Thus the transparencies, such as transparency 51, form film plates on a mounting web 55 so that different map areas can be viewed in accordance with the gross movement of the vehicle.

The mounting web 55 operates in a manner similar to a conventional film strip inasmuch as sequential transparencies are transported into a fixed position in front of the lens 49. In the preferred embodiment, the mounting web 55 is in fact a film strip. Unlike prior art map reader film strips, the mounting web 55 does not contain continuous strips of a map, but instead has a series of frames such as transparencies 51. More significantly, the transparencies are themselves further divided into sections, as will be described. Also, unlike prior art film strip map readers, the map reader of this embodiment does not move the position of the web 55 to incrementally move the position of a viewed section 57 of the map, except to change to a different film transparency 51. In the preferred embodiment, the web 55 is not incrementally moved, but is only moved to place different transparencies into position. This does not, of course, preclude small movements of the web 55 for alignment adjustments.

In order to explain the principles of operation only four of the nine possible sections of the transparency 51 are shown in FIGS. 1 and 4. The map shown in FIG. 2, is divided into equal map sections M1–M30. Let us consider that it is desired to display the dashed map section 57, shown in FIG. 2. Note that segment 57 is comprised of oddly shaped portions of map sections M15, M16, M21 and M22. Thus, to display section 57, we must position the center of the frame 51, which contains map sections M15, M16, M21 and M22, into a fixed position on the principal axis of the imaging lens, 49. It should be noted that map sections M15, M16, M21 and M22 are imaged on frames 51 suitably inverted or reversed in order to accommodate the images inversions introduced by the image reflections in the optical tunnel. Having thus positioned the filmstrip in a locked position we can now electronically take portions of map sections M15, M16, M21 and M22 and recombine them to form new map portion, which is section 57.

To explain how this is achieved let us look at a map 59 as shown in FIG. 3, where it is desired to display a new map section 57' as defined by the dashed lines. The new map section 57' is comprised of oddly shaped portions of map sections 61, 62, 63, 64. These map sections 61–64 must be appropriately inverted or reversed when they are imaged on frame 51 in FIG. 1. Thus frame 51 in FIG. 1 is imaged as shown in FIG. 4.

Redrawing the significant portion (61–64) of FIG. 3 in FIG. 5, I will assume that a greatly simplified television raster is comprised of line segments a-b-c-d-e-f-g-h. This is the raster as it would appear on a video display (not shown). Thus as the line segment a-b in FIG. 5 is drawn, this line segment a-b would be displayed on CRT 45 as shown in center portion 65 of FIG. 6. Due to the reflections in the optical tunnel, this line segment would appear as a-b on the reversed map section 61, also shown in FIG. 6. During this time, a shutter assembly 67 (FIG. 1) controlling the light coming from the CRT 45 and the optical tunnel 47 is opened, so that the light passing map section 61 can be detected by its photodetector 41.

When the line segment b-c (FIG. 5) is to be read by the map reader 40, the corresponding segment b-c is drawn on the flying spot scanner CRT 45 as shown in the center portion 65 of FIG. 6. The optical tunnel causes this line segment (b-c) to appear as shown in map section 62 in FIG. 6. During this period the section of the shutter assembly 67 (FIG. 1) that controls the light from map section 62 (FIG. 6) is opened, so that the light can be detected by its photodetector, 42. In like manner segments c-d, d-e, e-f, etc. are caused to be drawn and the light outputs suitably detected.

The detected outputs are sequentially added to form a video raster that is generated on the display that duplicates the scan shown in FIG. 5. In this manner we have caused the new map section 57' to be formed by combining portions of map sections 61-64.

We are now confronted with the task of generating the deflection waveform of the flying map reader 40 as shown in the center portion 65 of FIG. 6. This is done in accordance with which quadrant the segment is being drawn in FIG. 5. Thus for example when the line segment a-b is drawn it is in quadrant IV (upper left quadrant, map section 61), that is when X is negative and Y is positive, a control signal must be generated to open the shutter that will scan map section 61 in FIG. 5. Similarly for other scan line segments in FIG. 5, each quadrant has its unique property concerning shutter identification and direction of scan. Thus a coordinate transformation of X, Y sawtooth scan voltages are used to generate the deflection waveform of the flying spot scanner CRT 45. This transformation would be accomplished by a coordinate transform means, known to those skilled in the art, in which a resolver causes an angular shift in the scanned direction of the CRT 45. By not correspondingly shifting the output, the resultant output signal from the map reader 40 is righted with respect to the heading of the aircraft, indicated POS and, of course, is transformed with respect to the linearity of the map grid.

Figure 7:
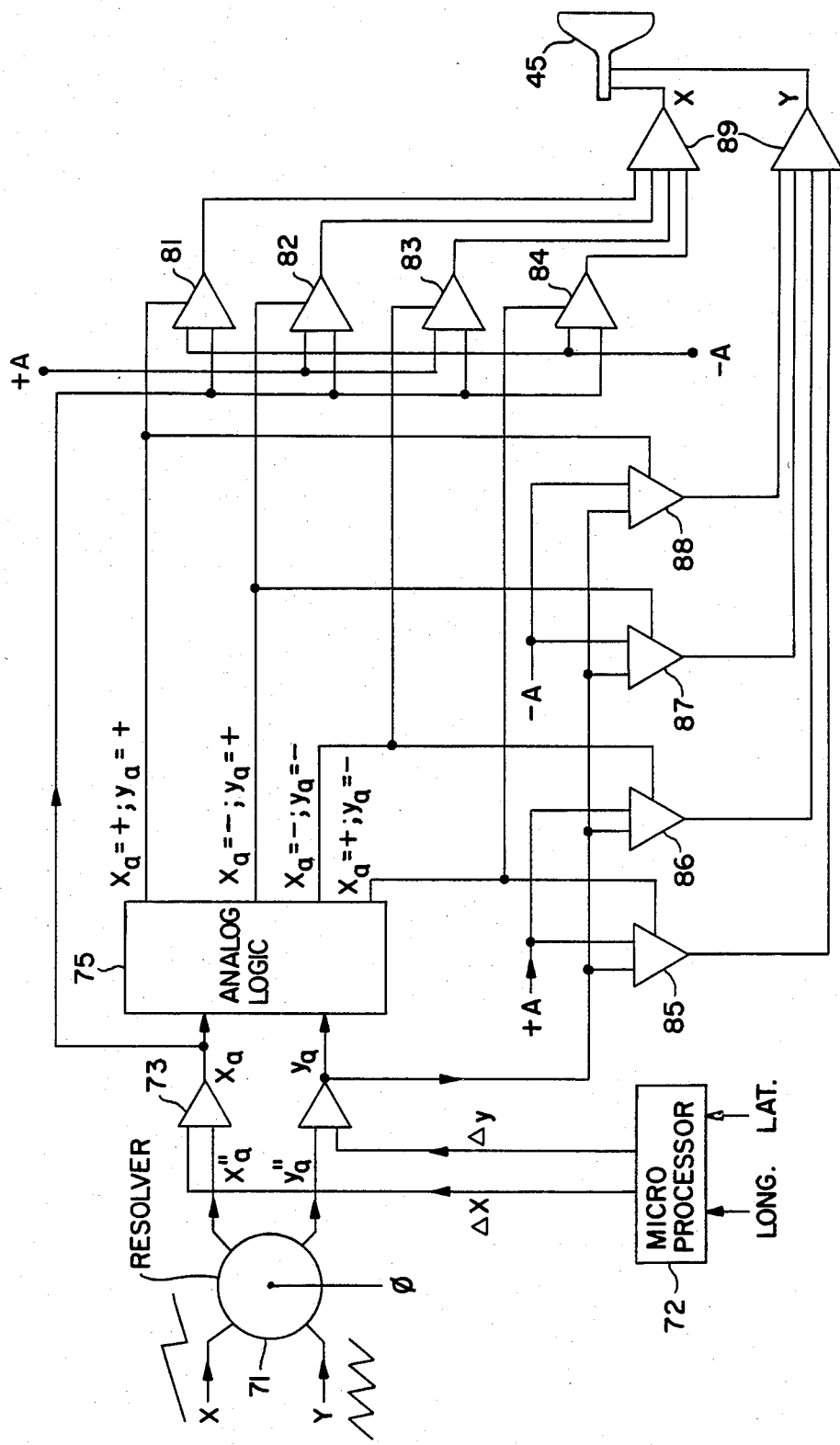
FIG. 7 is a block diagram showing a preferred arrangement for providing the line segments of FIG. 6.

FIG. 7 shows one arrangement for generating deflection current for the flying spot scanner CRT 45. In that figure, ordinary raster scanning signals $X_a$, $Y_a$, such as those used to drive an ordinary raster scanning device such as the cockpit display, are input into a resolver 71. The resolver 71 is provided with an appropriate electrical or mechanical heading signal, indicating the heading 0 of the vehicle. Switching means, such as microprocessor 72 is used to provide information concerning the longitude and latitude position of the display. Typically this information is obtained from a navigation computer. The positional information is combined with the information from the resolver 71 at a first pair of summing amplifiers 73. An analog logic circuit 75 provides information concerning the appropriate quadrant corresponding to map sections 61-64 in FIGS. 5 and 6, in which raster scanning is to take place. Signals +A and −A, corresponding to the size of an image to be produced on the flying spot scanner CRT 45, are provided to a series of rectilinear summing amplifiers 81-88, which sum the outputs from the first pair of summing amplifiers 73 in both the X and Y directions. The outputs and the analog logic circuit 75 is used to switch the appropriate X and Y rectilinear shift amplifiers 81-88, which provide signals used to drive deflection amplifiers 89 for providing deflection current to the flying spot scanner CRT 45.

While I have shown the use of video shutters 67 to control the video switching, it is obvious that switching could be achieved at the output of the photodetectors 41-44. Thus, the shutter assembly would not be used. Through the use of color separation filters and additional photodetectors, a color embodiment can be achieved.

Also note that only four of the nine positions on each frame of the film is used. More efficient utilization of the film can be achieved by adding additional map sections in the corners. Also the center portion could be used to provide frame calibration data that could, for example, be read during the vertical retrace period of the display. If not used for the frame calibration data, the center portion could be used to display a less detailed map or other data, either relating to the map or to information not relevant to map reading, such as a pre-flight procedure.

The use of four out of nine segments shown in FIG. 1 enables the system to align two overlapping displays (not shown) of the same location, despite changes in the position POS (FIG. 4) of the aircraft and the location of the composite map segment 53. If blanking and unblanking of photodetectors 41-44 shown in FIG. 1 is carried out in the above-described sequence when two displays of the same geographical location are superimposed from one transparency 51, the display of the composite map segment 53 would have the superimposed information reproduced. This would normally use eight of the nine segments 71-79 shown in FIG. 3. Naturally, different information, such as target identification, would appear on the second set of four segments.

It should be noted that, so long as provision is made to receive signals from the scanning of only one map segment at a time, the specific combination shown in FIG. 1 of the shutter arrangement 57, the lens assembly 59 and the blanking of photodetectors 41-44 can be varied. For example, a single photodetector can be used in combination with the shutter arrangement 67 if only one map section at a time is permitted to transfer light to the photodetector.

By scanning more than one map section simultaneously, at the same instant in time, it is possible to superimpose map or other information from the segments when such information is needed. Examples would include flight path information, warnings, target information, target highlighting and runway information.

It is possible to develop film plates with more than four or nine map sections on them, for example, 25, as the optical tunnel is apparently well adapted for superimposing a number of images equal to the square of an odd number. Likewise, while the figures described show only electronic changes of vector, it is also possible to use the inventive system in a map scanning apparatus in which the vector is mechanically changed. While a flying spot scanner CRT 45 has been described, it is also possible to use a different type of moving light beam scanner, such as a laser scanner (not shown). Accordingly, the present invention should be read only as limited and defined by the claims.

What is claimed:

1. A moving map display for displaying images of continuously changing locations of a map, characterized by:
    (a) means for converting electrical signals into optical signals, said means providing a line trace pattern;
    (b) image producing means translating the line trace pattern to a plurality of separate images thereof;
    (c) film carrier means for aligning a plurality of film frames to preselected positions, the image producing means focusing the images of the line trace patterns onto the positions;
    (d) means for receiving light transmitted through the film frames;
    (e) means disposed between the light receiving means and the image producing means selectively blocking and transmitting light passing through sections of the aligned film frame so that at any given time light from at least one section is being received by the light receiving means and light may be blocked from being transmitted through at least one of the sections to the light receiving means; and (f) means to control the line trace patterns so as to provide signals from the light receiving means representing a composite image of selectively one or more portions of the aligned film frame.

2. Apparatus as described in claim 1, further characterized by: the image producing means including a separate lens for each of said sections through which light is being transmitted.

3. Apparatus as described in claim 2, further characterized by: each film frame having nine of said sections.

4. Apparatus as described in claim 1, further characterized by: the film frames each including a single film transparency.

5. Apparatus as described in claim 4, further characterized by: the film transparencies having widths of less than 250 millimeters and greater than 25 millimeters.

6. Apparatus as described in claim 1, further characterized by:
   (a) the map display being located on board a vehicle; and
   (b) means to advance to subsequent film positions in accordance with the position and direction of travel of the vehicle.

7. Apparatus as described in claim 1, further characterized by: means to advance to subsequent film frames in accordance with the position of the composite map segment on the film sections.

8. Apparatus as described in claim 1, further characterized by: the film frames being changed in order to change the position of the composite map image which is scanned by the image producing means.

9. Apparatus as described by claim 2, further characterized by:
   (a) the film frames each comprising a single film transparency; and
   (b) a film transport device onto which the transparencies are mounted, the film transport device being advanced in accordance with the location on the map of the composite map image to be displayed.

10. A film cassette transparency carrier for a moving map display which displays images of a map in a vehicle in accordance with the vehicle's position and direction of travel, characterized by:
    (a) a plurality of transparencies;
    (b) a mounting web having a means to mount the plurality of slides thereon; and
    (c) each of the plurality of transparencies having a plurality of map sections thereon, each map section representing geography adjacent to at least one other map section on the transparencies, wherein a group of the map sections having adjacent geography are aligned so as to produce a composite image when scanned through an optical tunnel.

11. Apparatus as described in claim 10, wherein each transparency has a predetermined number of spaces thereon, the predetermined number being to the square of an odd integer, and each of the plurality of map sections completely appearing on separate ones of said spaces.

12. Apparatus as described in claim 11, wherein each transparency has nine spaces thereon, at least four of which are map sections.

13. Apparatus as described in claim 10, wherein a plurality of the map sections on each transparency are inverted, a plurality of the map sections on each transparency are reversed and a plurality of the sections on each transparency are both inverted and reversed.

14. Apparatus as described in claim 11, wherein a plurality of the map sections on each transparency are inverted, a plurality of the map sections on each transparency are reversed and a plurality of the map sections on each transparency are both inverted and reversed.

15. A moving map display for displaying images of continuously changing locations of a map, characterized by:
    (a) a plurality of sections of the map, the sections held in a still position;
    (b) a flying spot scanner providing a scan pattern;
    (c) means for simultaneously optically generating multiple images of the scan pattern onto the plurality of the map sections;
    (d) means for combining portions of said plurality of the map sections to create a new map section.

16. Apparatus as described in claim 15, further characterized by:
    (a) the map display being located on board a vehicle, and
    (b) means to advance to subsequent map sections in accordance with the position and direction of travel of the vehicle.

17. A moving map display for displaying images of a map in a moving vehicle at selected locations of the map in accordance with the vehicle's position and direction of travel, characterized by:
    (a) image receiving means for converting optical signals to electrical signals, using photodetection techniques;
    (b) an optical film projector being capable of scanning images of map sections on one of a series of individual film areas and up to at least four of said series of individual film areas and projecting the images onto the image receiving means, the film projector including raster scanning means, at least one lens and an optical tunnel;
    (c) means for changing the film area in accordance with a change in the position of the vehicle;
    (d) scanning control means for causing the optical film projector to optically scan desired segments of the image of at least one section and capable of optically scanning desired segments of at least four sections in order to produce a signal representing a single composite map section reconstructed from said scanned map sections, the scanning control means comprising means to shift the composite map segment in at least the x and y directions in accordance with the vehicle's position.

18. Apparatus as described by claim 17 further characterized by: the film areas each including a single film transparency.

19. Apparatus as described by claim 17, further characterized by:
    (a) the film areas each comprising a single film transparency; and
    (b) a film transport device onto which the transparencies are mounted, the film transport device being advanced in accordance with the location on the map of the composite map section to be displayed.

* * * * *